(12) United States Patent
Willmann et al.

(10) Patent No.: US 11,330,413 B2
(45) Date of Patent: May 10, 2022

(54) METHOD FOR OPERATING A TRANSMITTING DEVICE OF A MOTOR VEHICLE TRANSMITTING DEVICE FOR A MOTOR VEHICLE AND MOTOR VEHICLE

(71) Applicant: AUDI AG, Ingolstadt (DE)

(72) Inventors: Konstantin Willmann, Ingolstadt (DE); Tobias Mielke, Ingolstadt (DE)

(73) Assignee: Audi AG, Ingolstadt (DE)

( * ) Notice: Subject to any disclaimer, the term of this patent is extended or adjusted under 35 U.S.C. 154(b) by 409 days.

(21) Appl. No.: 16/493,719

(22) PCT Filed: Sep. 5, 2018

(86) PCT No.: PCT/EP2018/073813
§ 371 (c)(1),
(2) Date: Sep. 12, 2019

(87) PCT Pub. No.: WO2019/048451
PCT Pub. Date: Mar. 14, 2019

(65) Prior Publication Data
US 2020/0015049 A1    Jan. 9, 2020

(30) Foreign Application Priority Data

Sep. 11, 2017 (DE) ................... 10 2017 215 937.5

(51) Int. Cl.
*H04L 29/06* (2006.01)
*H04W 4/44* (2018.01)
*H04W 12/06* (2021.01)

(52) U.S. Cl.
CPC ............. *H04W 4/44* (2018.02); *H04L 63/083* (2013.01); *H04W 12/06* (2013.01)

(58) Field of Classification Search
CPC ............................... H04L 63/083; H04W 4/44
See application file for complete search history.

(56) References Cited

U.S. PATENT DOCUMENTS 11,025,602 B1 * 6/2021 Machani ............. H04L 63/0281
2010/0317367 A1   12/2010 Tamura
(Continued)

FOREIGN PATENT DOCUMENTS

CN    101925097 A    12/2010
CN    104081426 A    10/2014
(Continued)

OTHER PUBLICATIONS

Hongxu Chen et al., Synthesis and Verification of Motor-Transmission Shift Controller for Electric Vehicles, Apr. 2014, ACM, pp. 25-35. (Year: 2014).*
(Continued)

*Primary Examiner* — Luu T Pham
*Assistant Examiner* — Fahimeh Mohammadi
(74) *Attorney, Agent, or Firm* — Sterne, Kessler, Goldstein & Fox P.L.L.C.

(57) ABSTRACT

The present disclosure relates to a method for operating a transmitting device of a motor vehicle, in which method the transmitting device is operated in a private mode or in a transmitting mode. In the transmitting mode, the transmitting device transmits vehicle data to a computing device external to the vehicle. In the private mode, transmission of the vehicle data is stopped. A switchover from the transmitting mode into the private mode occurs as soon as a successful authentication of a specified user action has been captured.

12 Claims, 1 Drawing Sheet

(56) References Cited

U.S. PATENT DOCUMENTS

| | | | |
|---|---|---|---|
| 2011/0001638 A1 | 1/2011 | Pudar | |
| 2011/0060480 A1* | 3/2011 | Mottla | G01C 21/3608 |
| | | | 701/2 |
| 2011/0072501 A1* | 3/2011 | Fukui | H04L 63/101 |
| | | | 726/8 |
| 2011/0230165 A1 | 9/2011 | Kleve et al. | |
| 2012/0215391 A1* | 8/2012 | Schaefer | G07C 5/0858 |
| | | | 701/22 |
| 2012/0242475 A1* | 9/2012 | Guinart | G08C 17/02 |
| | | | 340/447 |
| 2013/0021145 A1 | 1/2013 | Boudy | |
| 2013/0090783 A1* | 4/2013 | Katou | B60R 25/24 |
| | | | 701/2 |
| 2013/0016941 A1 | 7/2013 | Amselem | |
| 2015/0118652 A1* | 4/2015 | Lawrenson | G06Q 50/30 |
| | | | 434/62 |
| 2015/0232065 A1* | 8/2015 | Ricci | B60H 1/00742 |
| | | | 701/36 |
| 2015/0379859 A1 | 12/2015 | Nespolo | |
| 2016/0200317 A1* | 7/2016 | Danzl | B60W 10/10 |
| | | | 701/25 |
| 2017/0126680 A1 | 5/2017 | Yusuf et al. | |
| 2020/0325838 A1* | 10/2020 | Gessenhardt | F01L 13/0036 |

FOREIGN PATENT DOCUMENTS

| | | |
|---|---|---|
| CN | 105763845 A | 7/2016 |
| CN | 106537463 A | 3/2017 |
| CN | 106878008 A | 6/2017 |
| DE | 602004011587 T2 | 1/2009 |
| DE | 102007059123 A1 | 6/2009 |
| DE | 102011005657 A1 | 1/2012 |
| DE | 102015109275 A1 | 12/2015 |
| EP | 1522981 A2 | 4/2005 |
| EP | 2573727 A1 | 3/2013 |

OTHER PUBLICATIONS

Philipp Mundhenk et al., Security in Automotive Networks: Lightweight Authentication and Authorization, Mar. 2017, ACM, vol. 22, Issue 2, pp. 25:1-25:27. (Year: 2017).*

Johan Wahlström et al., Smartphone-Based Vehicle Telematics, Apr. 4, 2017, IEEE, vol. 18, Issue: 10, pp. 2802-2825. (Year: 2017).*

Katsuyuki Umezawa et al., A Study on User Authentication Infrastructure for Next Generation Telematics, Oct. 10, 2008, IEEE, pp. 38-44. (Year: 2008).*

International Search Report, and Written Opinion of the International Searching Authority directed to related international Patent Application No. PCT/EP2018/073813, dated Nov. 30, 2018, with attached English language translation, and translation certification; 18 pages.

International Preliminary' Report on Patentability' directed to related International Patent Application No. PCT/EP2018/0738 13, issued Jun. 21, 2 019, with attached English-language translation; 12 pages.

* cited by examiner

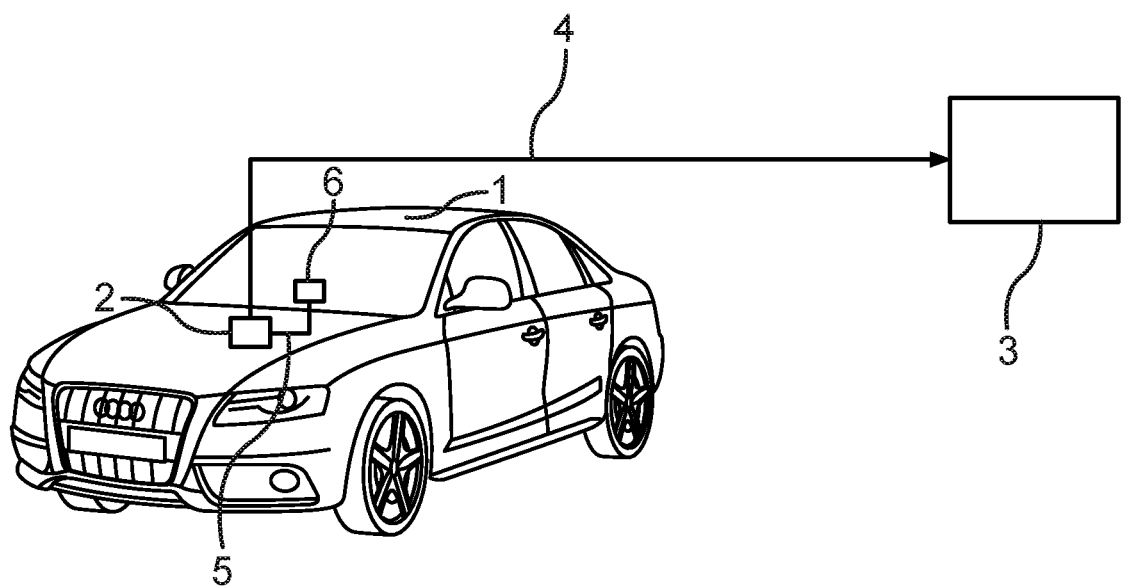

METHOD FOR OPERATING A TRANSMITTING DEVICE OF A MOTOR VEHICLE TRANSMITTING DEVICE FOR A MOTOR VEHICLE AND MOTOR VEHICLE

TECHNICAL FIELD

The present disclosure relates to a method for operating a transmitting device of a motor vehicle in which the transmitting device is operated in a private mode or in a transmitting mode, wherein, in the transmitting mode, the transmitting device transmits vehicle data to a computing device external to the vehicle, and in the private mode, it stops the transmission of the vehicle data, a transmitting device for a motor vehicle, and a motor vehicle having a transmitting device.

BACKGROUND

A method for operating a transmitting device of a motor vehicle is already known from DE 10 2011 005 657 A1. In this method, a preset signal is sent from an unsold vehicle until the time of purchase of said vehicle, thus allowing for a constant tracking of the vehicle. The constant tracking of the vehicle is thus allowed until a buyer drives the vehicle away from a location and the preset signal is deactivated.

Furthermore, from DE 10 2015 109 275 A1, a method for locating a desired device, particularly a vehicle, by means of a position detection module, which is arranged in a portable computing device, is known. In this case, a communication signal of the vehicle is received via a communication link by means of the position detection module. Subsequently, a position of the vehicle with respect to the portable computing device is correlated by means of the position detection module. The position detection module comprises a tracking module, by means of which signals, which are received by the desired device, particularly the communication signal, can be analyzed. When the tracking module is deactivated, the analysis of the received signals, particularly of the received communication signal, is stopped.

In addition, a method for controlling localized functions for a vehicle is known from US Patent Application Publication No. 2011/0001638 A1. These localized functions can be enabled using a private identifier.

BRIEF DESCRIPTION OF THE DRAWINGS/FIGURES

FIG. 1 shows a schematic view of a motor vehicle with a transmitting device, in accordance with some embodiments.

DETAILED DESCRIPTION

The present disclosure addresses the problem of providing a method for operating a transmitting device of a motor vehicle and a transmitting device for a motor vehicle, by means of which an owner of a motor vehicle can particularly advantageously adapt a transmitting behavior of the motor vehicle.

This problem is solved by a method for operating a transmitting device of a motor vehicle and by a transmitting device according to the independent patent claims. Advantageous embodiments with expedient developments of the invention are disclosed in the respective dependent claims and in the following description.

In some embodiments, a method for operating a transmitting device of a motor vehicle is disclosed, in which method the transmitting device is operated in a private mode or in a transmitting mode. In the transmitting mode, the transmitting device transmits vehicle data to a computing device external to the vehicle. In the private mode, the transmitting device stops a transmission of the vehicle data. This means that the transmitting device can be operated in the private mode, in which the vehicle data are not transmitted to the computing device external to the vehicle. In some embodiments, the transmitting device can be operated in the transmitting mode, in which the vehicle data are transmitted from the transmitting device to the computing device external to the vehicle. The respective position of the motor vehicle can be determined, for example, by means of a global navigation system and provided for the vehicle-external computing device by means of the transmitting device in the form of the vehicle data.

In some embodiments, to enable an owner of the motor vehicle to adapt a transmitting behavior of the motor vehicle in a particularly advantageous manner, it is provided that a switchover from the transmitting mode into the private mode takes place as soon as a successful authentication of a specified user action has been captured. In this case, the switchover takes place only if or only after the authentication is successful. In this case, the owner can switch from the transmitting mode into the private mode on the basis of a unique password received by the transmitting device. By way of non-limiting example, the transmitting device receives the unique password, for example, from the owner of the motor vehicle and consequently switches from the transmitting mode into the private mode. This means that, upon receiving the unique password, the transmitting device operated in the transmitting mode stops the transmission of the vehicle data to the computing device external to the vehicle. The unique password is, for example, a password, a PIN, biometric data, and/or an identifier of an RFID chip which the owner carries with him/her. The owner of the motor vehicle can thus effect a switching of the transmitting device by entering the unique password as the unique user action. Consequently, the predetermined user action comprises an authentication of the owner with respect to the motor vehicle, as well as an action of the owner which characterizes the switchover. It is thus possible for the authorized owner of the motor vehicle to adapt the transmitting behavior of the motor vehicle with regard to the vehicle data in accordance with said owner's requirements.

By way of non-limiting example, the transmitting device can support a mobile-key function of the motor vehicle. In the case of the mobile-key function, a smart device transmits a digital key to the motor vehicle in order to operate, particularly unlock, start and/or close said vehicle. As part of the mobile-key function, the transmitting device, in the transmitting mode, transmits to the vehicle-external computing device vehicle data which characterize the digital key received from the smart device or characterize a confirmation that the motor vehicle can be operated by means of the digital key received from the smart device. In the private mode, the transmission of vehicle data is stopped.

In some embodiments, the switchover from the private mode into the transmitting mode may occur as soon as a successful authentication of a specified user action has once again been captured. This means that the switchover from the transmitting mode into the private mode as well as the switchover from the private mode into the transmitting mode is only possible in case of a successful authentication by the transmitting device. The transmitting behavior of the motor vehicle can thus be adapted only by the authorized owner of the motor vehicle, for example, by entering said owner's unique password. Consequently, only the authorized owner of the motor vehicle can decide when the transmitting device is operated in the transmitting mode and can thus be tracked, for example, as part of an anti-theft function, and when the transmitting device is operated in the private mode, in which, for example, a tracking of the motor vehicle is not possible.

Accordingly, the transmitting device comprises a tracking device, wherein, in the transmitting mode, the tracking device transmits coordinate data, which characterize a respective position of the motor vehicle, as the vehicle data to the vehicle-external computing device, and in the private mode, the tracking device stops the transmission of the coordinate data. By way of non-limiting example, the transmitting device comprises the tracking device, and in the transmitting mode, the tracking device provides the coordinate data for the vehicle-external computing device, and in the private mode, it does not provide the coordinate data for the vehicle-external computing device. Based on the coordinate data, the vehicle-external computing device can track the motor vehicle. Thus, in the transmitting mode, an anti-theft protection is possible, whereas in the private mode, the privacy of the owner can be maintained.

In some embodiments while operating in the private mode, the transmitting device switches into the transmitting mode after a defined time interval has elapsed. By way of non-limiting example, the authorized owner can use the unique password to trigger the switchover of the transmitting device from the transmitting mode into the private mode. After expiration of the defined time interval, which, for example, is stored in the transmitting device, the transmitting device switches from the private mode back into the transmitting mode. For example, a tracking of the motor vehicle is not possible during the defined time interval due to its operation in the private mode. The privacy of a driver, for example, the authorized owner controlling the motor vehicle, can thus be ensured at least for the defined time interval. For example, different defined time intervals are assigned to different unique user actions. A first password entered can trigger operation of the transmitting device in the private mode for a first defined time interval, while a second password, which differs from the first password, triggers operation of the transmitting device in the private mode for a second time interval different from the first time interval. As a result, the owner, e.g., by transferring the password to a further person, can allow said further person to operate the motor vehicle in the private mode for the defined time interval. For example, this transferred password can lose its validity after a one-time use in order to ensure the highest possible security and the highest possible control for the owner.

In some embodiments, the transmitting device, upon receiving status information of a vehicle parameter, switches from the private mode into the transmitting mode. By way of non-limiting example, the vehicle parameter can be a location parameter that depends on a respective location, at which the motor vehicle is located, and/or it can be a country parameter that depends on a respective country, in which the motor vehicle is located. In such case, the status information describes the respective location or country. Thus, the transmitting device, which is operated in the private mode, can be switched from the private mode into the transmitting mode upon reaching the location or when crossing a national border, and thus being arranged in another country, on the basis of the associated status information. For example, if the motor vehicle is operated in a first country in the private mode, so that, for example, a tracking of the motor vehicle is not possible, the transmitting device switches from the private mode into the transmitting mode, when the national border is crossed and the motor vehicle is thus arranged in a country different from the first country, and so the motor vehicle can subsequently be located. Even when operating in the private mode, the motor vehicle can thus be tracked in the event of theft or misappropriation, for example, when the country border is crossed.

In some embodiments, the transmitting device may switch from the private mode into the transmitting mode on the basis of a time of day. For example, after midnight, the transmitting device switches from the private mode into the transmitting mode in order to be able to track the motor vehicle when the motor vehicle is stolen during the night.

In some embodiments, the transmitting device switches from the private mode into the transmitting mode on the basis of an ignition state as a vehicle parameter. Ignition state, for example, refers to an elapsed number of terminal 15 switches. For example, after a third terminal 15 switch during operation in the private mode, the transmitting device can switch back again into the transmitting mode. Alternatively, upon a detection of "terminal 15 on" and/or upon a detection of "terminal 15 off," the transmitting device can switch from the private mode into the transmitting mode. As a result, a tracking of the motor vehicle for individual trips taken with the motor vehicle trips can, for example, be prevented by the switchover from the private mode into the transmitting mode on the basis of the ignition state and thus on the basis of a starting of the motor vehicle.

In some embodiments, if the predetermined user action is captured by means of an on-board user interface. For example, the transmitting device can receive the unique password from the owner via an on-board detection device of the motor vehicle as the on-board user interface. By way of non-limiting example, the unique user action is received by means of the on-board detection device, and information about the receipt of the unique user action is transmitted to the transmitting device. It is thus necessary for the authorized owner of the motor vehicle to be inside the motor vehicle in order to effect at least the switchover from the transmitting mode into the private mode. It can thus be ruled out that the motor vehicle is switched from the transmitting mode into the private mode by means of a device external to the vehicle. The switchover from the private mode into the transmitting mode can also be effected via the on-board user interface or alternatively via the device external to the vehicle.

In some embodiments, if the predetermined user action is the entry of the password, which is matched for authentication with a password stored in a memory of the motor vehicle. In this case, the stored password for the comparison with the entered password is received by means of the transmitting device from the memory of the motor vehicle. In particular, the password stored in the memory is vehicle-specific and static. By entering the password as a unique user action, the owner can identify himself/herself to the motor vehicle in order to be authenticated by the motor vehicle using the entered password in the course of the comparison. This has the advantage that the stored password can only be stored in the transmitting device and the password to be entered by the owner can only be stored by the authorized owner, and access from the external device to the transmitting device for the switchover from the transmitting mode into the private mode is thus particularly difficult.

In some embodiments, the predetermined user action is the entry of the password, and a password, which is matched in the course of authentication with the entered password, is generated by means of a server device external to the vehicle. Upon receiving the password generated by the vehicle-external server device, the transmitting device can switch over when the comparison with the unique password received from the owner is successful. By way of non-limiting example, the vehicle-external server device generates the generated password and transmits it to the transmitting device to effect the switchover from the transmitting mode into the private mode after a successful comparison with the entered password. For example, the authorized owner of the vehicle-external server device can communicate by means of a smart device that said owner intends to switch the transmitting device from the transmitting mode into the private mode. As a result, the vehicle-external server device generates the unique password, which it can transmit directly to the transmitting device or output to the authorized owner, and so said owner can perform the predetermined user action, e.g., the entry of the password. For example, with the entered password, the authorized owner can be uniquely authenticated by the vehicle-external server device. As a result, a particularly simple authentication of the authorizing owner with respect to the transmitting device or the owner by means of the transmitting device is advantageously possible. The password generated by means of the vehicle-external server device can be valid, for example, only for a defined interval in order to ensure particularly high security.

After the password has been generated, the vehicle-external server device can transmit it to the owner and/or to the transmitting device. After the password has been entered by the owner to the transmitting device, for example, by means of the on-board user interface, the transmitting device can compare the entered password with the password generated by the server device external to the vehicle. For this purpose, the transmitting device can request the generated password from the server device external to the vehicle. By way of non-limiting example, the transmitting device can transmit the entered password for comparison to the vehicle-external server device which, after a successful comparison, can transmit authentication information to the transmitting device. Based on this authentication information, the transmitting device can successfully authenticate the predetermined user action.

In some embodiments, a transmitting device for a motor vehicle is disclosed. The transmitting device is designed to execute a method as described herein in accordance with some embodiments.

In some embodiments, a motor vehicle having a transmitting device as described herein in accordance with some embodiments is disclosed.

Advantages and advantageous developments of the method as described herein in accordance with some embodiments are to be regarded as advantages and advantageous developments of the transmitting device and the motor vehicle as described herein in accordance with some embodiments. For this reason, the advantages and advantageous developments of the transmitting device and the motor vehicle in accordance with some embodiments of the method shall not be described again.

In the following, embodiments of the present disclosure shall be described with reference to FIG. 1 that shows a schematic view of a motor vehicle with a transmitting device, by means of which vehicle data, which characterize a respective position of the motor vehicle, are transmittable to a computing device external to the vehicle.

The embodiments described in the following are preferred embodiments and each constitute individual features to be considered independently of one another, or in a combination different from the depicted combination. In addition, the embodiments described can also be supplemented by further features as already described above.

In the drawing, elements with the same function are denoted with the same reference signs.

FIG. 1 shows a schematic view of a motor vehicle with a transmitting device, in accordance with some embodiments. FIG. 1 show a schematic view of a motor vehicle 1 having the tracking device 2 for theft prevention. The transmitting device can comprise further devices, which are not described in more detail, by means of which vehicle data can be transmitted to a computing device 3 external to the vehicle.

The tracking device 2 is a component of the transmitting device (not depicted). Furthermore, the vehicle-external computing device 3 is shown, to which coordinate data 4 are transmittable as vehicle data by means of the tracking device 2. Using the coordinate data 4, the motor vehicle 1 can be tracked by means of the computing device 3 external to the vehicle.

The tracking device 2 is operated in a private mode or a tracking mode, wherein in the tracking mode, the tracking device 2 transmits the coordinate data 4 to the computing device 3 external to the vehicle, and in the private mode, it stops a transmission of the coordinate data 4 to the computing device 3 external to the vehicle.

In accordance with some embodiments, to enable an owner of the motor vehicle 1 to adapt a transmitting behavior of the motor vehicle 1 in a particularly advantageous manner, it is provided that a switchover from the tracking mode into the private mode takes place as soon as a unique authentication of a specified user action has been captured. In the present example, the unique user action is an entry of a password 5. Thus, the switchover from the tracking mode into the private mode is effected on the basis of the unique password 5 received by the tracking device 2. In this case, both the switchover from the private mode into the tracking mode and the switchover from the tracking mode into the private mode is effected on the basis of a respective authentication using the unique user action. The tracking device 2 receives the unique password 5 from an on-board detection device 6 of the motor vehicle 1 as an on-board user interface. Via said on-board detection device 6, the owner of the motor vehicle 1 is authenticated by the entry of the password 5 as a unique user action. The on-board detection device 6 transmits the entered password 5 to the tracking device 2, which authenticates the owner based on the password 5 entered. In this case, the entered password 5 can be compared with a vehicle-specific and static password stored in a memory of the motor vehicle or compared with a password generated by means of a vehicle-external server device or the vehicle-external computing device 3 upon a request by the owner.

After the entered password 5 is received by the tracking device 2, the tracking device 2 can compare the entered password 5 with the password stored in the vehicle-external server device or the vehicle-external computing device 3 and, on the basis of the comparison, switch between the private mode and the tracking mode. As a result, a validity of the entered password 5 can be validated.

After receiving the entered password 5, the tracking device 2 can switch from the private mode into the tracking mode, or switch from the private mode into the tracking mode after a defined time interval has elapsed. Upon receiving status information of a vehicle parameter, the tracking device 2 can alternatively switch from the private mode into the tracking mode on the basis of the status information. The status information can be a location, at which the motor vehicle 1 is located, or an ignition state of the motor vehicle 1. "Ignition state" refers to a number of terminal 15 switches made in the private mode.

The described method for operating the tracking device 2 is based on the knowledge that mobile online services in a vehicle are divided into comfort services and security-related online services. In addition to an emergency call, the security-related online services also include those services that are associated with theft protection. An introduction of a privacy mode allows a deactivation of the comfort services via a human-machine interface in the vehicle. In this case, a driver of the vehicle is provided with a tool which allows said driver to protect the driver's privacy and to control, which data are allowed or not allowed to be sent from the vehicle to an external server in accordance with the driver's anonymity requirements. In a dormant mode, which is also referred to as a sleep mode, a SIM card of the vehicle logs out of a mobile network, thus deactivating all services and sending no data from the vehicle to the external server. As a result, this prevents a tracking of the vehicle and ensures maximum privacy. Some security-related online services require permanent accessibility of the vehicle by the external server. For security reasons, they are sometimes designed to prevent the SIM card from logging out. This ensures a functionality in an emergency, and the vehicle can be reliably tracked in case of a notification of theft. An emergency call does not require a permanent accessibility of the vehicle because the emergency call is initiated exclusively from the vehicle, either by an accident or by a manual actuation of an SOS button. In sleep mode, the vehicle cannot be tracked. The SIM card immediately logs on to the mobile network only in an emergency, thus initiating the emergency call.

This results in the disadvantages that all of the above-mentioned security-related online services with their requirements for permanent accessibility of the vehicle are in target conflict with the privacy requirements of the driver of the vehicle. With a purchase decision for a vehicle with a theft tracking system, the driver loses the option to fully protect his/her privacy by logging out the SIM card in the vehicle. For the protection of the driver's anonymity, said driver might thus decide entirely against a purchase of online mobile services.

In some embodiments, to avoid these disadvantages, mobile online services relevant for a tracking in case of theft, particularly security-related online services, such as a vehicle tracking system or a remote vehicle tracking, are supposed to allow for either their temporary or permanent deactivation by entering a code, particularly the unique password 5, known only to the owner of the motor vehicle 1. This code can be vehicle-related static or generated case by case by the vehicle-external computing device 3, and subsequently be matched online by means of the tracking device 2 when entered in the on-board detection device 6. As a result, the owner of the motor vehicle 1 has the option at any time to select between a security of a theft tracking system and an anonymity by logging out the SIM card into the sleep mode, which is the private mode described above.

For many drivers of the motor vehicle 1, privacy and theft protection are crucial aspects for a vehicle purchase. A commitment to only one of the two aspects, security and anonymity, at the time of an acquisition of the motor vehicle 1 would not be required. Instead, the owner would be able to weigh up the security requirements and anonymity requirements in each situation and adapt the transmitting behavior of said owner's motor vehicle 1 independently.

In accordance with some embodiments of the method, an authorization feature or the code, which represents the unique password 5, can be requested or generated either in a web portal of the vehicle-external computing device 3 or directly in the motor vehicle 1. An input option of the authorization feature in the motor vehicle 1 with subsequent authorization in the motor vehicle 1 or an authorization via the vehicle-external computing device 3 or via a vehicle-external server device can be provided in order to deactivate selected security-related online services. If a security-related online service to be deactivated is connected to financial benefits with regard to insurance companies or other institutions, these parties should be notified about the deactivation.

Depending on the desired security level, a comparison of the entered password with the password stored in the motor vehicle 1 or with the password generated by means of the vehicle-external server device or the vehicle-external computing device 3 is to be selected. The owner of the motor vehicle 1 should in any case be able to change the password, with which the entered password 5 is to be compared. The owner can change the password stored in the memory in the motor vehicle 1 or change the password generated by the vehicle-external server device or the vehicle-external computing device 3 via a web portal connected to the vehicle-external server device or the vehicle-external computing device 3. A duration of the logout of the SIM card can be specified by the owner or coupled to certain states of the motor vehicle 1. The SIM card can be logged out for 24 hours or forever or until a third terminal 15 switch during operation in the private mode, etc.

Overall, the embodiments demonstrate how a password-secured authorization for deactivating protected services can be provided, in this case, e.g., a tracking of the motor vehicle 1. By means of the authorization, an on-board deactivation of protected services, in this case, e.g., the tracking of the motor vehicle 1, can occur by entering additional authorization features.

The invention claimed is:

1. A method for operating a transmitting device of a motor vehicle, the method comprising:
   capturing a first successful authentication of a specified user action;
   performing a first switchover and a second switchover of an operating mode of the transmitting device, wherein the operating mode comprises a transmitting mode and a private mode;
   transmitting, from the transmitting device to a computing device external to the motor vehicle, vehicle data of the motor vehicle when the transmitting device is in the transmitting mode; and
   preventing transmission of the vehicle data of the motor vehicle when the transmitting device is in the private mode,
   wherein the first switchover of the operating mode of the transmitting device is from the transmitting mode into the private mode, and occurs upon the first successful authentication of the specified user action having been captured,
   wherein the second switchover of the operating mode of the transmitting device is from the private mode into the transmitting mode, and is based on at least one of a time of day, and receipt of status information of a vehicle parameter, the second switchover from the private mode into the transmitting mode comprising capturing a second successful authentication of the specified user action, wherein the specified user action comprises an entry of a password, and the capturing the first successful authentication and the second successful authentication of the specified user action comprises matching the entry of the password with a password stored in a memory of the motor vehicle, and wherein the vehicle parameter comprises one of a location parameter, a country parameter, and an elapsed number of terminal switches.

2. The method of claim 1, wherein the transmitting device comprises a tracking device, and wherein the vehicle data comprises coordinate data corresponding to a respective position of the motor vehicle.

3. The method of claim 1, further comprising performing the second switchover of the operating mode of the transmitting device from the private mode into the transmitting mode after a configurable time interval has elapsed.

4. The method of claim 1, wherein the vehicle parameter further comprises an ignition state of the motor vehicle, and the method further comprises performing the second switchover of the operating mode of the transmitting device from the private mode into the transmitting mode based on the ignition state of the motor vehicle.

5. The method of claim 1, wherein the specified user action is captured using an on-board user interface.

6. The method of claim 1, wherein the password stored in the memory of the motor vehicle is generated by a server device external to the motor vehicle.

7. The method of claim 1, wherein the password stored in the memory of the motor vehicle is generated by a server device external to the motor vehicle.

8. A transmitting device for a motor vehicle, the transmitting device comprising a mobile network access circuit, the transmitting device configured to perform operations comprising:

capturing a first successful authentication of a specified user action;

performing a first switchover and a second switchover of an operating mode of the transmitting device, wherein the operating mode comprises a transmitting mode and a private mode;

transmitting, from the transmitting device to a computing device external to the motor vehicle, vehicle data of the motor vehicle when the transmitting device is in the transmitting mode; and preventing transmission of the vehicle data of the motor vehicle when the transmitting device is in the private mode, wherein the first switchover of the operating mode of the transmitting device is from the transmitting mode into the private mode, and occurs upon the first successful authentication of the specified user action having been captured, wherein the second switchover of the operating mode of the transmitting device is from the private mode into the transmitting mode, and is based on at least one of a time of day, and receipt of status information of a vehicle parameter, the second switchover from the private mode into the transmitting mode comprising capturing a second successful authentication of the specified user action, wherein the specified user action comprises an entry of a password, and the capturing the first successful authentication and the second successful authentication of the specified user action comprises matching the entry of the password with a password stored in a memory of the motor vehicle, and wherein the vehicle parameter comprises one of a location parameter, a country parameter, and an elapsed number of terminal switches.

9. The transmitting device of claim 8, further comprising a tracking device, and wherein the vehicle data comprises coordinate data corresponding to a respective position of the motor vehicle.

10. A motor vehicle comprising:

a transmitting device configured to perform operations comprising:

capturing a first successful authentication of a specified user action;

performing a first switchover and a second switchover of an operating mode of the transmitting device, wherein the operating mode comprises a transmitting mode and a private mode;

transmitting, from the transmitting device to a computing device external to the motor vehicle, vehicle data of the motor vehicle when the transmitting device is in the transmitting mode; and preventing transmission of the vehicle data of the motor vehicle when the transmitting device is in the private mode, wherein the first switchover of the operating mode of the transmitting device is from the transmitting mode into the private mode, and occurs upon the first successful authentication of the specified user action having been captured, wherein the second switchover of the operating mode of the transmitting device is from the private mode into the transmitting mode, and is based on at least one of a time of day, and receipt of status information of a vehicle parameter, the second switchover from the private mode into the transmitting mode comprising capturing a second successful authentication of the specified user action, wherein the specified user action comprises an entry of a password, and the capturing the first successful authentication and the second successful authentication of the specified user action comprises matching the entry of the password with a password stored in a memory of the motor vehicle, and wherein the vehicle parameter comprises one of a location parameter, a country parameter, and an elapsed number of terminal switches.

11. The motor vehicle of claim 10, wherein the transmitting device further comprises a tracking device, and wherein the vehicle data comprises coordinate data corresponding to a respective position of the motor vehicle.

12. The motor vehicle of claim 10, further comprising an on-board user interface, wherein the specified user action is captured using the on-board user interface.

* * * * *